United States Patent
Weilant

[19]

[11] Patent Number: 5,842,947
[45] Date of Patent: Dec. 1, 1998

[54] PLANETARY GEAR CARRIER HAVING A BAND BRAKE ON AN AXIAL EXTENSION OF THE CARRIER FOR TRANSFER CASES

[75] Inventor: David R. Weilant, Muncie, Ind.

[73] Assignee: Borg-Warner Automotive, Inc., Sterling Heights, Mich.

[21] Appl. No.: 775,651

[22] Filed: Dec. 31, 1996

[51] Int. Cl.⁶ .............................. F16H 3/44; F16H 37/02
[52] U.S. Cl. .......................................... 475/323; 475/207
[58] Field of Search .................................. 475/204, 207, 475/210, 220, 323, 325, 326, 327; 188/78.8, 196 D

[56] References Cited

U.S. PATENT DOCUMENTS

| | | | |
|---|---|---|---|
| 741,686 | 10/1903 | Lombard . | |
| 905,065 | 11/1908 | Firth . | |
| 2,528,314 | 10/1950 | Langdon | 74/789 |
| 2,667,240 | 1/1954 | Wilkinson et al. | 188/204 |
| 2,810,304 | 10/1957 | Ball | 475/323 X |
| 2,901,925 | 9/1959 | Gunderson et al. | 475/323 |
| 2,975,870 | 3/1961 | Vosler et al. | 188/77 |
| 3,003,367 | 10/1961 | Winchell | 74/688 |
| 3,019,671 | 2/1962 | Albinson et al. | 74/758 |
| 3,246,868 | 4/1966 | Martens et al. | 248/355 |
| 3,386,535 | 6/1968 | Bishop et al. | 188/77 |
| 3,516,519 | 6/1970 | Besoyan | 188/77 |
| 4,009,969 | 3/1977 | Kadera et al. | 415/217 |
| 4,388,986 | 6/1983 | Umezawa | 188/77 |
| 4,691,593 | 9/1987 | Mueller | 475/207 |
| 4,930,373 | 6/1990 | Nakawaki et al. | 475/128 |
| 5,018,434 | 5/1991 | Haka | 92/29 |
| 5,139,468 | 8/1992 | Churchill et al. | 475/323 X |
| 5,235,899 | 8/1993 | Hauser | 92/110 |
| 5,328,419 | 7/1994 | Motl et al. | 475/323 X |
| 5,445,246 | 8/1995 | Haka et al. | 188/77 |
| 5,584,776 | 12/1996 | Weilant et al. | 475/207 X |
| 5,620,077 | 4/1997 | Richard | 192/120 |

FOREIGN PATENT DOCUMENTS

| | | | |
|---|---|---|---|
| 13759 | 4/1907 | United Kingdom | 475/207 |

*Primary Examiner*—Khoi Q. Ta
*Attorney, Agent, or Firm*—Brinks, Hofer, Gilson & Lione; Greg Dziegielewski

[57] ABSTRACT

A two speed transfer case assembly includes a planetary gear speed reduction assembly, a shift sleeve for selecting either reduced speed drive through the planetary gear assembly or direct drive from the transfer case input. The planet carrier of the speed reduction assembly includes a band brake disposed thereabout. A linear actuator selectively, adjustably tightens the band brake to control retardation of the planet carrier thereby controlling the speed of the carrier and thus the output of the planetary gear assembly. This configuration cancels the drag torque typically applied to the input of a transfer case from the associated automatic transmission and minimizes or eliminates the relative rotation between the shifting elements in the transfer case allowing smoother shifts. When fully engaged, the planetary carrier brake can also serve as a wet parking brake.

20 Claims, 3 Drawing Sheets

PLANETARY GEAR CARRIER HAVING A BAND BRAKE ON AN AXIAL EXTENSION OF THE CARRIER FOR TRANSFER CASES

BACKGROUND OF THE INVENTION

The invention relates generally to two-speed transfer cases and more specifically a two-speed transfer cases having a planetary gear speed reduction assembly carrier surrounded by an adjustably controlled band brake.

In both early and modern four-wheel drive vehicles, a transfer case receives the drive torque from the output of a transmission and provides its output at all times to a primary drive line and on a selective basis to a secondary drive line. The power distribution criteria are manifold. A mechanical center differential may distribute drive power; an operator actuated clutch may engage and disengage the secondary drive line or an automatic system may control a clutch which engages and disengages the secondary drive line depending upon vehicle operating conditions such as wheel slip.

In more sophisticated vehicles, the transfer case may include a planetary gear speed reduction assembly which, when combined with a dog clutch or assembly structure, provides a reduced speed drive through the planetary assembly or a direct drive by coupling the transfer case output directly to the output of the vehicle transmission.

As evidenced by some of the complicated operational schemes required to accomplish shifts into and out of four-wheel drive and also shifts between the high and low range of the transfer case, integration of the transfer case and its operation into the overall operation of the motor vehicle has not been seamlessly achieved. For example, the configuration of certain transfer cases is such that the vehicle must be brought to a complete stop before the four-wheel drive feature is engaged to a disengaged. In others, the vehicle must be driven in reverse several feet in order to release locking hubs and in still others, the driver must dismount to couple and uncouple the vehicle locking hubs.

Two speed transfer cases likewise present challenges for smooth control, typically relating to shifting between the two speed ranges. The difficulty of such shifts can generally be characterized as one of synchronism, that is, matching the speed of the high and low speed drives to the speed of transfer case output shaft.

Various transmission and transfer case devices address this problem. For example, U.S. Pat. No. 3,019,671 teaches a transmission having a disc pack clutch assembly and a brake band wrapped about the periphery of the outer housing of the disc pack clutch assembly. The brake is actuated by a hydraulic device. In U.S. Pat. No. 4,930,373, a similar hydraulic actuator drives a brake band which is disposed about the periphery of an automatic transmission member.

U.S. Pat. No. 5,018,434 teaches a self-adjusting hydraulic servo-mechanism which actuates a friction band which again engages a portion of a planetary gear set disposed within an automatic transmission.

U.S. Pat. No. 5,235,899 is similar to the '434 patent and discloses a different hydraulic servo-mechanism.

U.S. Pat. No. 5,445,246 discloses an additional hydraulic servo-controlled brake band which is disposed about the periphery of a planetary gear assembly ring gear. Again, this device is typically incorporated within an automatic transmission.

From the foregoing, it is apparent that band type brakes have been utilized in connection with planetary gear assemblies but that improvements utilizing related structures within two-speed transfer cases have not been fully exploited.

SUMMARY OF THE INVENTION

A two speed transfer case assembly includes a planetary gear speed reduction assembly, a shift sleeve for selecting either reduced speed drive through the planetary gear assembly or direct drive from the transfer case input. The planet carrier of the speed reduction assembly includes a band brake disposed thereabout. A linear actuator selectively, adjustably tightens the band brake to control retardation of the planet carrier thereby controlling the speed of the carrier and thus the output of the planetary gear assembly. This configuration cancels the drag torque typically applied to the input of a transfer case from the associated automatic transmission and minimizes or eliminates the relative rotation between the shifting elements in the transfer case allowing smoother shifts. When fully engaged, the planetary carrier brake can also serve as a wet parking brake.

BRIEF DESCRIPTION OF THE DRAWINGS

FIG. 4 is a full, sectional view of a planet carrier and proportional band brake according to the present invention.

DESCRIPTION OF THE PREFERRED EMBODIMENT

Figure 1:
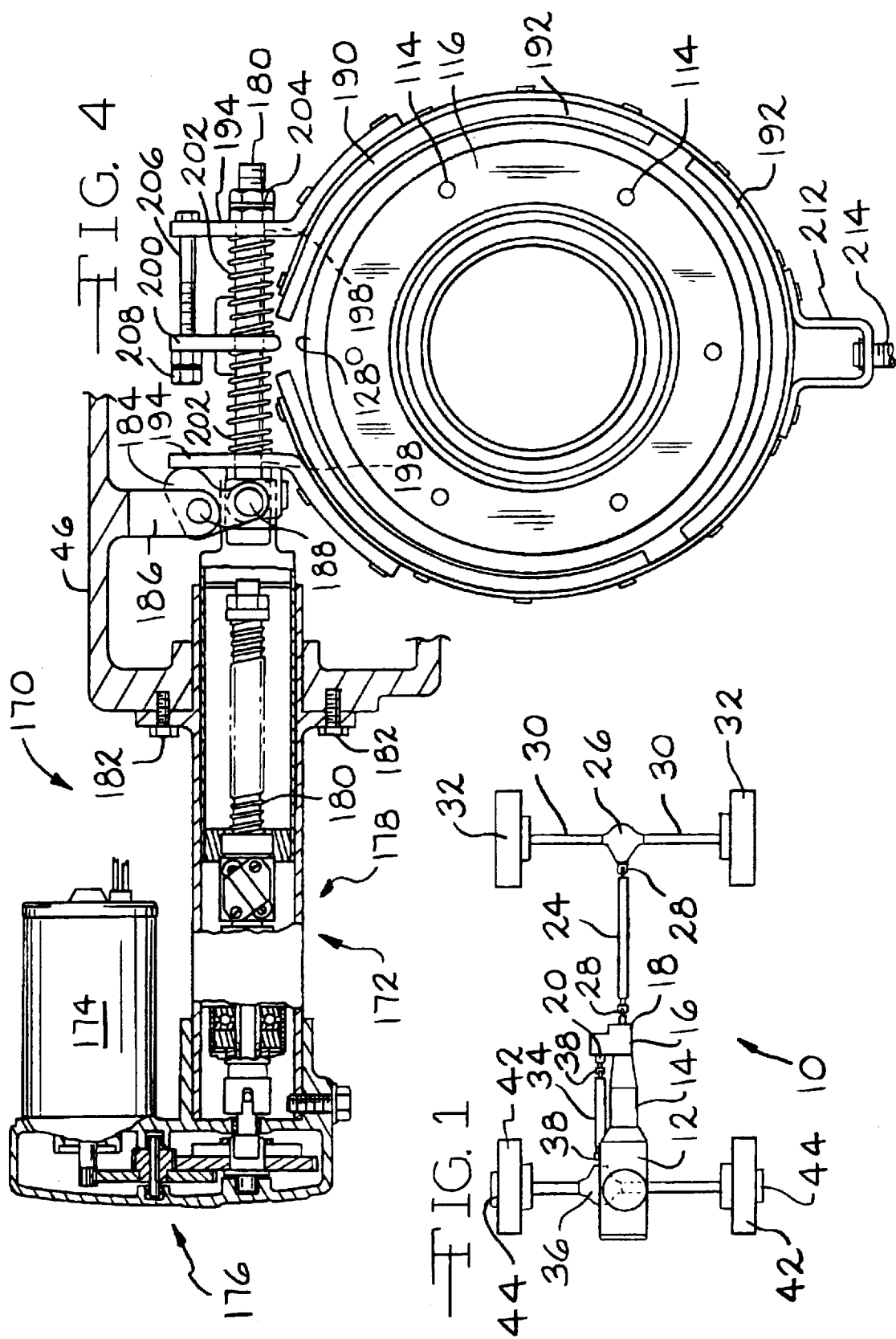
FIG. 1 is a diagrammatic plan view of a four-wheel drive motor vehicle drive line having a transfer case incorporating the present invention.

Referring now to FIG. 1, a vehicle drive system incorporating the present invention is illustrated and generally designated by the reference numeral 10. The vehicle drive system 10 includes a prime mover such as an internal combustion engine 12 having an output which is operably coupled to a transmission 14. The transmission 14, in turn, has an output which is operably coupled to a transfer case assembly 16 according to the instant invention. The transfer case assembly 16 includes a main or primary, rear output shaft 18 and a secondary, front output shaft 20. The primary output shaft 18 of the transfer case assembly 16 drives a rear drive shaft 24 which delivers power to a rear differential 26. Universal joints 28 are utilized as necessary and in accordance with conventional practice to couple the rear drive shaft 24 to the primary output shaft 18 and the rear differential 26. The output of the rear differential 26 is coupled through rear drive axles 30 to a pair of rear tire and wheel assemblies 32. In the rear wheel drive arrangement illustrated, the rear drive shaft 24, the rear differential 26, the universal joints 28, the rear drive axles 30 and the rear tire and wheel assemblies 32 constitute a primary (full-time) drive line.

Similarly, the front or secondary output shaft 20 of the transfer case assembly 16 drives a front drive shaft 34 which delivers power to a front differential 36. Again, appropriate universal joints 38 are utilized as necessary in accordance with conventional practice to couple the secondary output shaft 20 to the front drive shaft 34 and the front differential 36. The front differential 36 delivers power through a pair of front axles 40 to a pair of front tire and wheel assemblies 42. Preferably, a respective pair of locking hubs 44 selectively couple the front axles 40 to a respective one of the tire and wheel assemblies 42. The locking hubs 44 may be either manually or remotely and automatically activated. In the rear wheel drive arrangement illustrated, the front drive shaft 34, the front differential 36, the universal joints 38, the front drive axles 40, the front tire and wheel assemblies 42 and the locking hubs 44 constitute a secondary (part-time) drive line.

Figure 2:
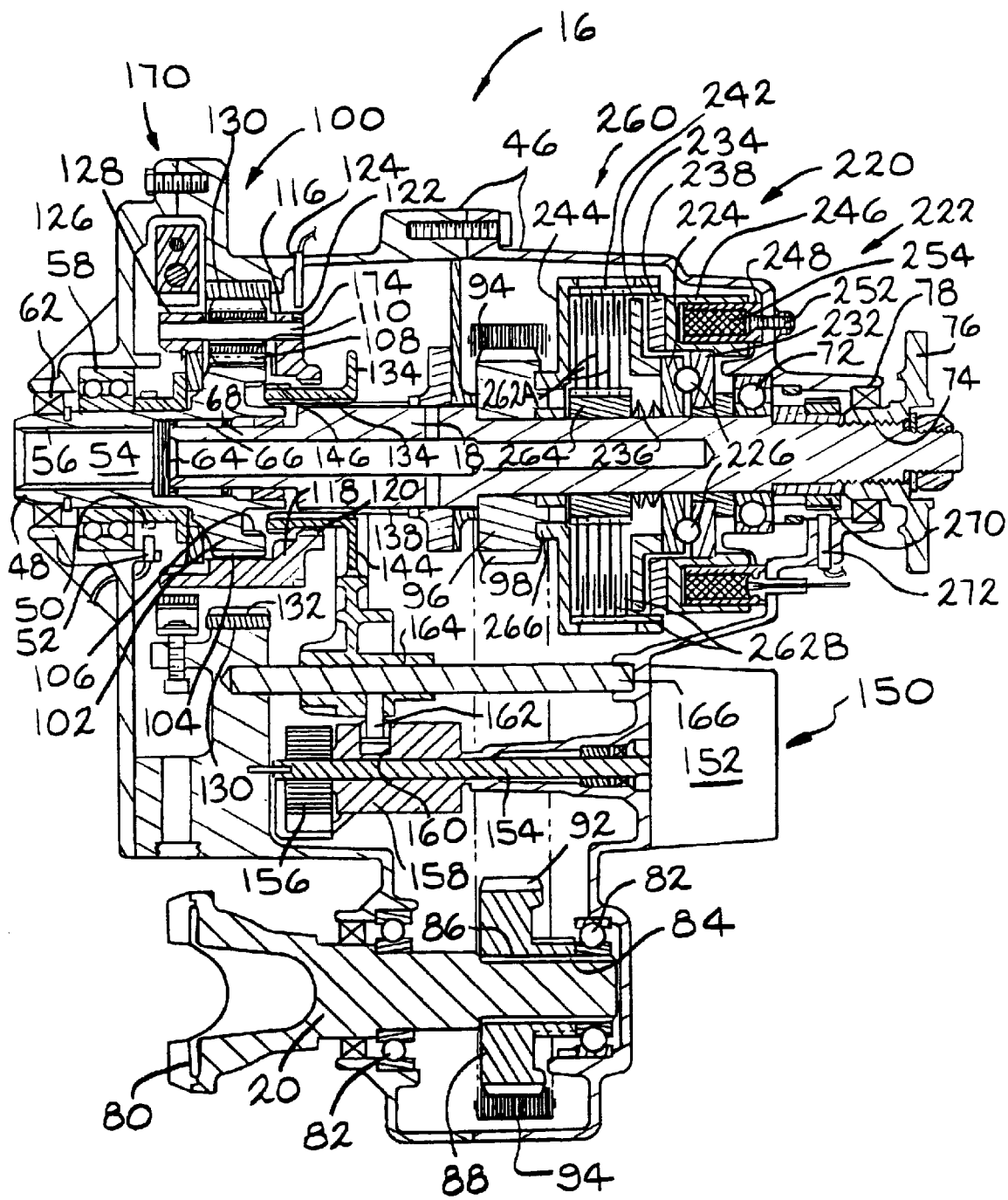
FIG. 2 is a full, sectional view of a motor vehicle transfer case incorporating the present invention.
Figure 3:
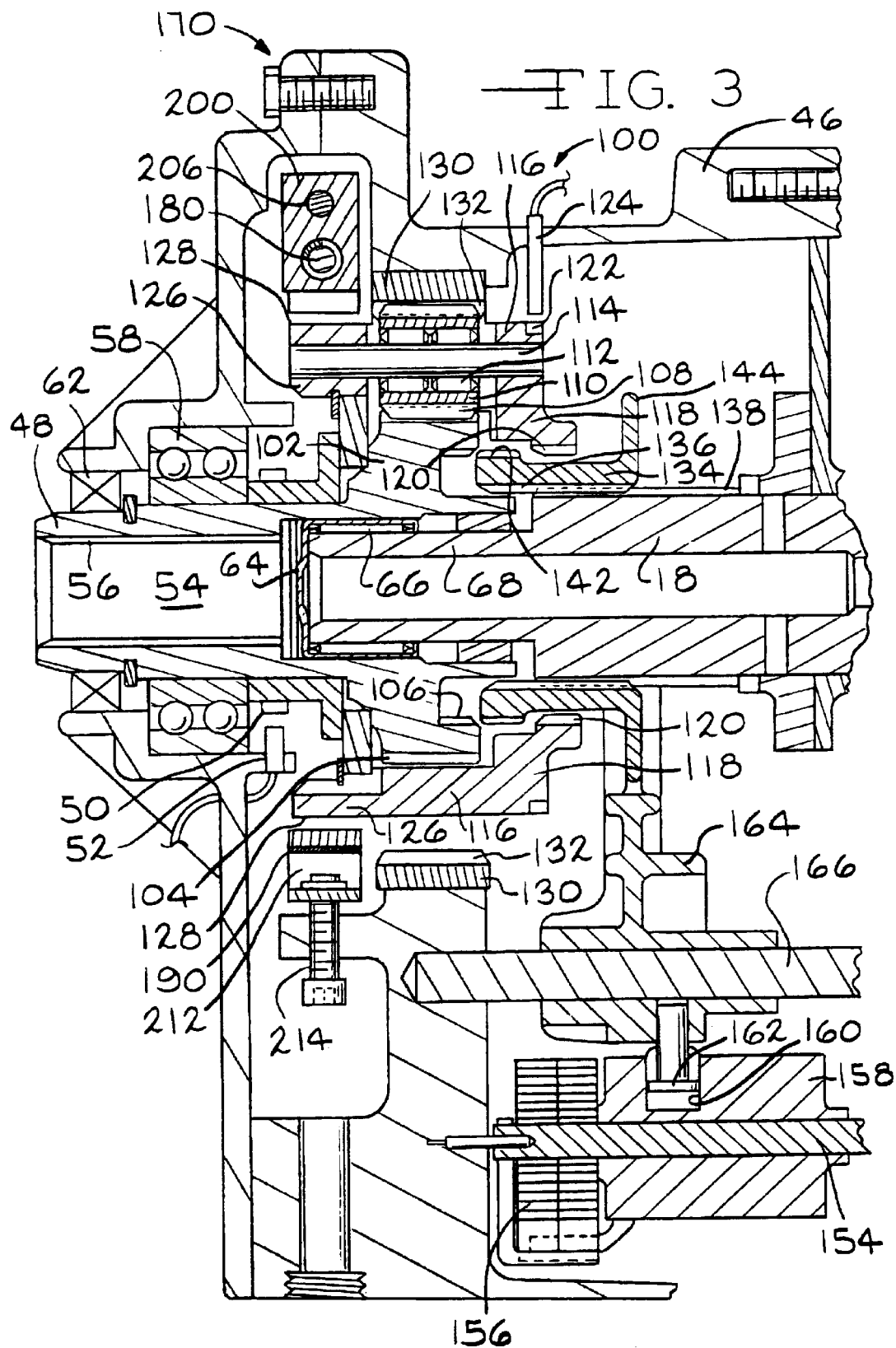
FIG. 3 is an enlarged, fragmentary sectional view of a motor vehicle transfer case according to the present invention.

Referring now to FIGS. 2 and 3, the transfer case assembly 16 includes a multiple part, typically cast, housing 46 having various openings for shafts and fasteners and various mounting surfaces and grooves for shaft seals, bearings, seal retaining grooves and other internal components as will be readily appreciated from inspection of FIGS. 2 and 3. The housing 46 receives a stub input shaft 48 having a tone wheel 50 disposed thereupon which rotates therewith. A sensor 52 such as a Hall effect or variable reluctance device provides a signal useful for detecting or deriving the rotational speed of the input shaft 48. The input shaft 48 defines a through, stepped bore 54 having a region of first diameter defining a plurality of female splines or gear teeth 56 or other suitable structures for engaging and drivingly receiving a complementarily configured output shaft (not illustrated) of the transmission 14 illustrated in FIG. 1.

The input shaft 48 is partially supported upon an anti-friction bearing such as the ball bearing assembly 58. A shaft seal 62 surrounds the input shaft 48 at the forward end of the housing 46. A larger diameter region of the stepped bore 54 of the input shaft 48 receives a cup shaped shaft seal 64 and a roller bearing assembly 66. The roller bearing assembly 66, in turn, receives and rotatably supports a reduced diameter region 68 of the first or primary output shaft 18. The opposite end of the primary output shaft 18 is rotatably supported in an anti-friction bearing such as a ball bearing assembly 72. The end of the primary output shaft 18 preferably includes male threads 74 and may receive a complementarily threaded flange 76 which may be secured to associated drive line elements illustrated in FIG. 1. A shaft seal 78 provides an appropriate seal between the threaded flange 76 and the housing 46.

The housing 46 of the transfer case assembly 16 also receives a second or secondary output shaft 20 which may be integrally formed with or include a fitting or coupling 80 which forms a portion of a universal joint 38 or similar drive line component. The secondary output shaft 20 is supported by a pair of anti-friction bearings such as the ball bearing assemblies 82. The secondary output shaft 20 includes a region of male splines 84. The male splines 84 receive and rotatably engage complementary female splines 86 disposed on the inner surface of a driven chain sprocket 88 having chain teeth 92. A drive chain 94 extends around and is received upon a chain drive sprocket 96 having chain teeth 98. The chain drive sprocket is freely rotatably disposed upon the output shaft 18.

Referring now to FIGS. 2 and 3, the transfer case assembly 16 incorporates a planetary gear speed reduction assembly 100. The planetary gear speed reduction assembly 100 includes a centrally disposed sun gear 102 having gear teeth 104 which is preferably integrally formed on and rotates with the input shaft 48. Also formed in the input shaft 48 and disposed radially inwardly from the sun gear 102 is a set of female splines or gear teeth 106. The gear teeth 104 of the sun gear 102 drivingly engage complementary gear teeth 108 formed on a plurality of pinion or planet gears 110, one of which is illustrated in both FIGS. 2 and 3. The planet gears 110 receive and are supported upon anti-friction bearings such as roller bearing assemblies 112 which, in turn, are supported on stub shafts 114 which are mounted and retained within a planet carrier 116.

The planet carrier 116 includes a first axial extension 118, to the right as viewed in FIGS. 2 and 3, having a plurality of female splines or gear teeth 120 which are configured identically to the female splines or gear teeth 106 on the input shaft 48. The first axial extension 118 also includes a plurality of teeth which form a tone wheel 122 and cooperate with a sensor 124 such as a Hall effect or variable reluctance sensor to provide a signal useful for detecting or deriving the rotational speed of the planet carrier 116. The planet carrier 116 also includes a second axial extension 126, to the left as viewed in FIGS. 2 and 3, which includes an annular circumferential friction surface 128. A ring gear 130 having gear teeth 132 complementary to the gear teeth 108 of the planet gears 110 is fixedly secured within the housing 46 in operating alignment with the planet gears 110.

An axially sliding shift sleeve or reduction hub 134 is concentrically disposed about the primary output shaft 18 and includes female splines or gear teeth 136 which are in constant mesh and driving engagement with complementary male splines or gear teeth 138 disposed on the exterior of the primary output shaft 18. The shift sleeve 134 also includes a set of male splines or gear teeth 142 proximate one end which are complementary to the female splines or gear teeth 106 and 120 on the input shaft 48 and the extension 118 of the planet carrier 116, respectively. A radially outwardly directed flange 144 is disposed on the end of the shift sleeve 130 opposite the splines or gear teeth 142.

Axial translation of the shift sleeve 134 may thus be undertaken to selectively couple and directly drive the primary output shaft 18 from the input shaft 48 (high gear) when the shift sleeve 134 is in a position to the left of that illustrated in FIGS. 2 and 3 such that the gear teeth 106 and 142 are engaged. When the shift sleeve 134 is in a position to the right of that illustrated in FIGS. 2 and 3, such that the splines or gear teeth 120 and 142 are engaged, the primary output shaft 18 is driven by the carrier 116 of the planetary gear speed reduction assembly 100 at a reduced speed (low gear) established by the gear ratio of the planetary gear assembly 100. When the shift sleeve 134 is in the position illustrated in FIGS. 2 and 3, there is no driving connection between the input shaft 48 and the primary output shaft 18 and the transfer case assembly 16 is in neutral.

Selective axial translation of the shift sleeve 134 and thus selection of either direct drive (high gear), reduced speed drive through the planetary gear assembly 100 (low gear) or neutral is achieved by an actuator assembly 150. The actuator assembly 150 includes an electric, pneumatic or hydraulic drive motor 152 which rotates a shaft 154. The shaft 154 drives an energy storing flat coil spring 156 which, in turn, drives a cam assembly 158 having a cam pathway 160. A cam follower pin 162 is seated within the cam pathway 160 in the cam assembly 158 and, as the shaft 154 and the cam assembly 158 rotate, the follower pin 162 bi-directionally translates a shift fork 164 along a cylindrical bearing 166. The shift fork 164, in turn, engages the flange 144 of the shift sleeve 134. As noted, the flat coil spring 156 provides a resilient, energy storing interconnection between the drive motor 152 and the shift fork 164 whereby the shift motor 152 may reach a desired position but the shift fork 164 and shift sleeve 134 may not move into a corresponding desired position until forces acting upon the shift sleeve 134 have lessened to a point where energy stored in the spring 156 will complete the shift commanded by the drive motor 152.

Referring now to FIGS. 3 and 4, a planetary carrier brake assembly 170 is illustrated and includes a linear actuator assembly 172 preferably including a bi-directional electric drive motor 174 which drives a speed reducing gear train 176. The speed reducing gear train 176 may include one or more pinion and spur gears which reduce the speed of the drive motor 174 while increasing its torque. The output of the speed reducing gear train 176 is provided to a ball screw assembly 178 which changes the bi-directional reduced speed output of the gear train 176 into linear, bi-directional motion of a linear output shaft 180. The linear actuator assembly 172 is mounted through a sealed opening in the housing 46 by suitable fasteners 182 and the output shaft 180 extends into the interior of the transfer case housing 46 adjacent and generally tangent to the second axial extension 124 of the planet carrier 116.

It will be appreciated that comparable or analogous linear actuator assemblies such as a bi-directional piston and cylinder assemblies which are hydraulically or pneumatically powered or other analogous mechanical devices may be substituted for the linear ball screw actuator assembly 172 illustrated. It should also be appreciated, however, that one of the benefits of the electrically powered linear actuator assembly 172 illustrated is that the assembly 172 maintains the selected linear position of the output shaft 180 when electrical power is removed from the motor 174, a feature which generally improves control and minimizes power consumption and thus heat generation within the electric drive motor 174.

Pivotally secured to the output shaft 180 generally adjacent the linear actuator assembly 172 is a single or double bell crank or cam lever 184. The cam lever 184 is, in turn, pivotally disposed within a mounting clevis or lug 186 formed in or attached to the housing 46. Pivot pins 188 secure the cam lever 184 to the control rod and to the mounting clevis or lug 186. A brake band 190 preferably includes a plurality of strips of suitable clutch or brake friction material 192 disposed about the circumferential friction surface 126 on the extension 124 of planet carrier 116. The brake band 190 includes a pair of generally parallel, outwardly directed ears or lugs 194. The ears or lugs 194 each includes aligned, through apertures 198 which receive the output shaft 180. The output shaft 180 also extends through a fixed web or plate 200 extending from the housing 46 which is generally centrally disposed between the ears 194 and is preferably generally radially oriented with the respect to the axis of the input shaft 48 and output shaft 18.

A respective one of a pair of compression springs 202 extends between each of the ears 194 and the fixed plate 200 and bias the ears 194 away from the fixed plate 200 as will be readily appreciated. A pair of locking or jam nuts 204 facilitates adjustment of the position of the output shaft 180 relative to the right-most ear 194. A machine bolt 206 having a pair of locking or jam nuts 208 adjusts the position of the right-most ear 194 relative to the center plate or web 200. A U-shaped strap 212 which may be secured to the brake band 190 by rivets, threaded fasteners, weldments or any suitable fastening means, is captively secured to a threaded adjustment bolt 214. The threaded adjustment bolt 214 may be rotated to raise and lower the bottom portion of the brake band 190 to adjust the clearance between the friction material 192 and the circumferential friction surface 126 of the planet carrier 116 in the lower, adjacent region of the brake band 190.

The operation of the selectively braked planetary gear carrier assembly 170 according to the present invention is straightforward. At the outset, it should be understood that the terms "selectively braked" as used by the inventor herein is intended to mean adjustably or proportionally and thus includes, and the assembly provides, the ability to modulate from 0% to 100% the amount of braking force applied to the planetary gear carrier 116. Thus, the linear actuator assembly 172 may be adjusted or positioned to provide no drag to the planetary gear carrier 116 and increase the drag or braking on the planet carrier 116 to the point wherein the planet carrier 116 is tightly clamped or braked and thus and effectively non-rotatable. Subsumed within this adjustable and modulatable action is, of course, a device which functions simply as a two state, i.e., on/off, device having but two positions: a fully released planetary carrier 116 which functions as a conventional planetary carrier and fully locked carrier 116.

Thus, the operation of the present invention comprehends adjustable or modulatable control of the braking of the planetary gear carrier 116. As such, electrical power is provided to the electric motor 174 to advance or retract the output shaft 180 to tighten or loosen the brake band 190 about the friction surface 126 of the planet carrier 116. As the output shaft 180 is retracted, the right-most ear 194 is drawn to the left and, through the action of the cam lever 184, the left-most ear 192 is cammed to the left thereby clamping the brake band 190 about the circumferential friction surface 126. Reverse operation of the electric motor 174 and extension of the output shaft 180 relaxes the brake band 190 and reduces or terminates braking of the planetary carrier 116 as will be readily appreciated.

This operation has many uses. First of all, it may be utilized to cancel the drag torque which is typically applied to the input shaft 48 of a transfer case assembly 16 from an associated automatic transmission 14. Second of all, it may be utilized to minimize or eliminate speed differences between the components of the transfer case assembly 16 by synchronizing the planet carrier 116 such that shifts by the shift sleeve 134 will occur when the primary output shaft 18 and the planet carrier 116 are in synchronism. Furthermore, when fully engaged, the planetary carrier brake serves to fully lock up the drive line of the vehicle 10 and thus serves as a wet parking brake. It will be recalled that the linear actuator assembly 172 maintains its position when power is removed from the electric motor 174. Thus, the planetary carrier brake assembly 170 may be fully engaged, the planet carrier 116 locked and prevented from rotation and power removed from the electric motor 174. The linear actuator assembly 172 will maintain its position and thus the carrier 116 will remain braked in the absence of electrical power making this assembly suitable for use as a parking brake as noted. Finally, it will be appreciated that the sensor 52 associated with tone wheel 50 on the input shaft 48, the sensor 124 associated with the tone wheel 122 on the planet carrier 116 and the sensor 272 associated with the tone wheel 270 on the output shaft 18, provide signals which may be utilized by an electronic controller or microprocessor (both not illustrated) to provide a servo-control signal to the electric motor 174 to control and achieve synchronism of the input shaft 48 or the planet carrier 116 with the output shaft 18 to facilitate shifting or for some other purpose or simply to have an indication of the present speeds of the input shaft 48, the planet carrier 116 and the output shaft 18 for any purposes requiring such information.

Referring again to FIG. 2, the transfer case assembly 16 also includes electromagnetically actuated disc pack assembly 220. The disc pack assembly 220 is disposed about the output shaft 18 and includes operator or actuator assembly 222 having a circular drive member 224 rotationally coupled to the output shaft 18 through a set of female splines or gear teeth which engage a complementary set of splines or gear teeth on the output shaft 18. One face of the circular drive member 224 includes a plurality of circumferentially spaced apart recesses in the shape of an oblique section of a helical torus. Each of the plurality of recesses receives one of a like plurality of load transferring balls 226.

A circular driven member 232 disposed adjacent the circular drive member 224 includes a like plurality of recesses on an opposing face which define the same shape as the recesses in the drive member 224. The oblique sidewalls of the recesses function as ramps or cams and cooperate with the balls 226 to drive the circular members 224 and 232 axially apart in response to relative rotation therebetween. It will be appreciated that the recesses and the load transferring balls 226 may be replaced with other analogous mechanical elements which cause axial displacement of the circular members 224 and 232 in response to relative rotation therebetween. For example, tapered rollers disposed in complementarily configured conical helices may be utilized.

The circular drive member 224 is secured to or integrally formed with a radially outwardly extending apply plate 234. A compression spring 236 is concentrically disposed about the output shaft 18. The compression spring 236 may include a plurality of Belleville springs or wave washers. The compression spring 236 provides a biasing or restoring force to the circular drive member 224 and the apply plate 234 urging them to the right as illustrated in FIG. 2. Behind, i.e., to the right of the apply plate 234, and generally aligned therewith is a clutch armature 238. The clutch armature 238 includes a plurality of male splines or gear teeth disposed about its periphery which engage a complementary plurality of female splines or gear teeth 242 which extend axially along the inner surface of a cylindrical portion of a bell shaped clutch housing 244.

Positioned adjacent the face of the clutch armature 238 opposite the apply plate 234 is a soft iron rotor 246. The rotor 246 is freely rotatably received upon a complementarily configured stationary coil housing 248. The rotor 246 is coupled to and rotates with the circular driven member 232 by virtue of a splined interconnection or other securement such as a friction fit or weldments. The coil housing 248 is secured to the housing 46 of the transfer case assembly 16 by a plurality of suitable fasteners 252, one of which is illustrated in FIG. 2. The coil housing 248 receives an electromagnetic coil 254 which is connected to a source of electrical energy through a conductor (not illustrated).

Adjacent the apply plate 234 and contained within the clutch housing 244 is a disc pack assembly 260. The disc pack assembly 260 includes a plurality of interleaved friction plates or discs 262. A first plurality of smaller diameter discs 262A are received upon the male splines of a splined collar 264 which in turn seats upon male splines of the output shaft 18. The first plurality of friction discs 262A and the splined collar 264 thus all rotate with the primary output shaft 18. A second plurality of larger diameter discs 262B are interleaved with the first plurality of discs 262A and include splines about their peripheries which engage the splines or gear teeth 242 on the inner surface of the cylindrical portion of the clutch housing 244 and rotate therewith. The clutch housing 244 is concentrically disposed about the primary output shaft 18 and includes a plurality of axial lugs or projections 266 which are received within complementarily configured openings or apertures in the chain drive sprocket 96. The chain drive sprocket 96, is, as noted, freely rotatably disposed about the primary output shaft 18 and includes chain drive teeth 98 about its periphery which engage the drive chain 94. The drive chain 94 transfers power to the driven sprocket 88 coupled to the secondary output shaft 20.

It will be appreciated that energization of the electromagnetic coil 254 creates a magnetic flux which produces drag and thence relative rotation between the circular drive member 224 and the circular driven member 232 thereby driving them apart. As the circular members 224 and 232 separate, a compressive force is applied through the apply plate 234 to the disc pack assembly 260. Compression of the friction discs 262A and 262B results in torque transfer from the primary output shaft 18 to the chain drive sprocket 96, the drive chain 94, the driven chain sprocket 88 and the secondary output shaft 20. The magnitude of torque transfer from the primary output shaft 18 to the secondary output shaft 20 from no torque transfer to 50 percent torque transfer, that is, an equal split of torque between the two output shafts 18 and 20, can be controlled by adjusting the magnitude of electrical energy provided to the electromagnetic coil 254. Further details of the structure and operation of the disc pack assembly 220 may be found in co-owned U.S. Pat. No. 5,407,024 granted Apr. 18, 1995 which is hereby incorporated by reference.

To facilitate rotational speed sensing of all relevant rotating components of the transfer case assembly 16, a third tone wheel 270 is affixed to and rotates with the primary output shaft 18 and a proximately disposed sensor 272 which may be a Hall effect or variable reluctance sensor provides a signal useful for detecting or deriving the rotational speed of the output shaft 18.

The foregoing disclosure is the best mode devised by the inventor for practicing this invention. It is apparent, however, that apparatus incorporating modifications and variations will be obvious to one skilled in the art of planetary gear and transfer case assemblies. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A planetary gear and brake assembly comprising, in combination, an input member having a sun gear, a planet carrier disposed about said sun gear and having a peripheral brake surface, at least two planet gears rotatably disposed in said planet carrier, a stationary ring gear disposed about and engaged by said planet gears, a brake band disposed about said brake surface, and an actuator for selectively clamping said brake band on said brake surface.

2. The planetary gear and brake assembly of claim 1 further including an output member adapted for selective coupling to said input member or said planet carrier.

3. The planetary gear and brake assembly of claim 2 wherein said output member is an axially slidable clutch having teeth and said input member and said planet carrier have teeth engageable by said teeth on said collar.

4. The planetary gear and brake assembly of claim 1 wherein said brake band includes friction material.

5. The planetary gear and brake assembly of claim 1 wherein said actuator is a linear ball screw actuator and includes an electric motor and speed reducing gear train.

6. The planetary gear and brake assembly of claim 1 further including a pair of compression springs operatively disposed between said actuator and said brake band.

7. The planetary gear and brake assembly of claim 1 further including a tone wheel disposed on said input member and said planet carrier and a sensor for providing a speed signal disposed adjacent each of said tone wheels.

8. The planetary gear and brake assembly of claim 1 wherein said planetary gear and brake assembly is disposed within a motor vehicle transfer case.

9. A two speed planetary gear and brake assembly comprising, in combination, an input member having a sun gear and first output teeth, a planet carrier disposed about said sun gear and having a friction surface and second output teeth, a plurality of planet gears rotatably disposed in said planet carrier, a ring gear disposed about and engaged by said planet gears, a brake band disposed about said friction surface, an actuator for selectively clamping said brake band on said friction surface, and a clutch collar having teeth selectively engageable with said first output teeth or said second output teeth.

10. The two speed planetary gear and brake assembly of claim 9 wherein said brake band include friction material.

11. The two speed planetary gear and brake assembly of claim 9 wherein said actuator is a linear actuator and includes an electric motor and speed reducing gear train.

12. The two speed planetary gear and brake assembly of claim 9 further including a pair of compression springs operatively disposed between said actuator and said brake band.

13. The two speed planetary gear and brake assembly of claim 9 further including a tone wheel disposed on said input member and said planet carrier and a sensor for providing a speed signal disposed adjacent each of said tone wheels.

14. The two speed planetary gear and brake assembly of claim 9 wherein said planetary gear and brake assembly is disposed within a motor vehicle transfer case.

15. A planetary gear and brake assembly comprising, in combination, a sun gear, a planet carrier disposed about said sun gear and having an axial extension, at least two planet gears rotatably disposed in said planet carrier, a ring gear substantially radially aligned with said planet gears, a friction surface on said axial extension axially offset from said substantially radially aligned gears, a brake band disposed about said friction surface and including friction material, and an actuator for adjustably tightening and loosening said brake band about said friction surface, whereby said planet carrier may be modulatably restricted from rotation or freed to rotate by bi-directional movement of said actuator.

16. The planetary gear and brake assembly of claim 15 further including an axially slidable clutch having teeth and wherein said sun gear has teeth engageable by said teeth on said clutch and said planet carrier has teeth engageable by said teeth on said clutch.

17. The planetary gear and brake assembly of claim 15 wherein said brake band includes friction material and wherein said actuator is linear ball screw actuator and includes an electric motor and speed reducing gear train.

18. The planetary gear and brake assembly of claim 15 further including a tone wheel disposed on said input member and said planet carrier and a sensor for providing a speed signal disposed adjacent each of said tone wheels.

19. The planetary gear and brake assembly of claim 15 wherein said planetary gear and brake assembly is disposed within a motor vehicle transfer case.

20. The planetary gear and brake assembly of claim 19 wherein said motor vehicle transfer case includes an output shaft having a tone wheel and a speed sensor disposed adjacent said tone wheel.

* * * * *